(12) United States Patent
Jeon et al.

(10) Patent No.: US 12,238,402 B2
(45) Date of Patent: Feb. 25, 2025

(54) ELECTRONIC DEVICE IN WHICH SIGNAL LINES OF CAMERA ARE REDUCED

(71) Applicant: SAMSUNG ELECTRONICS CO., LTD., Suwon-si (KR)

(72) Inventors: Jina Jeon, Suwon-si (KR); Doukyoung Song, Suwon-si (KR); Hyoungil Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 18/118,237

(22) Filed: Mar. 7, 2023

(65) Prior Publication Data
US 2023/0209168 A1 Jun. 29, 2023

Related U.S. Application Data

(63) Continuation of application No. PCT/KR2021/010921, filed on Aug. 18, 2021.

(30) Foreign Application Priority Data

Sep. 7, 2020 (KR) .................. 10-2020-0113851
Feb. 4, 2021 (KR) .................. 10-2021-0016338

(51) Int. Cl.
*H04N 23/57* (2023.01)
*G02B 27/01* (2006.01)
(Continued)

(52) U.S. Cl.
CPC ......... *H04N 23/57* (2023.01); *G02B 27/0172* (2013.01); *G06F 3/013* (2013.01);
(Continued)

(58) Field of Classification Search
CPC ........ H04N 23/57; H04N 23/50; H04N 23/66; H04N 23/90; H04N 19/42; H04N 23/51;
(Continued)

(56) References Cited

U.S. PATENT DOCUMENTS

| | | | |
|---|---|---|---|
| 5,734,421 | A | 3/1998 | Maguire et al. |
| 8,576,276 | B2 | 11/2013 | Bar-Zeev et al. |

(Continued)

FOREIGN PATENT DOCUMENTS

| | | |
|---|---|---|
| KR | 10-2006-0033768 | 4/2006 |
| KR | 10-2012-0075580 | 7/2012 |

(Continued)

OTHER PUBLICATIONS

Extended European Search Report dated Jan. 30, 2024 for EP Application No. 21864560.4.
(Continued)

*Primary Examiner* — Fernando Alcon
(74) *Attorney, Agent, or Firm* — Nixon & Vanderhye P.C.

(57) ABSTRACT

An electronic device may include: at least one camera; an encoder connected to the at least one camera through a first interface having a first number of signal lines; and a decoder connected to the encoder through a second interface having a second number of signal lines that is less than the first number. The encoder can provide, to the decoder through the second interface, data acquired from the at least one camera through the first interface and data encoded on the basis of identification information indicating each of the first number of signal lines.

15 Claims, 14 Drawing Sheets

(51) Int. Cl.
  *G06F 3/01* (2006.01)
  *H04N 23/50* (2023.01)
  *H04N 23/66* (2023.01)
  *H04N 23/90* (2023.01)
(52) U.S. Cl.
  CPC ............. *H04N 23/50* (2023.01); *H04N 23/66* (2023.01); *H04N 23/90* (2023.01); *G02B 2027/0138* (2013.01); *G02B 2027/014* (2013.01); *G02B 2027/0178* (2013.01)
(58) Field of Classification Search
  CPC ........ G02B 27/0172; G02B 2027/0138; G02B 2027/014; G02B 2027/0178; G02B 27/0176; G02B 27/0093; G06F 3/013; G06F 3/011; G06F 13/4282
  See application file for complete search history.

(56) References Cited

U.S. PATENT DOCUMENTS

| | | | |
|---|---|---|---|
| 9,395,543 | B2 | 7/2016 | Lamb et al. |
| 10,739,850 | B2 | 8/2020 | Stafford et al. |
| 10,914,957 | B1 | 2/2021 | Stahl et al. |
| 11,184,601 | B2 | 11/2021 | Gu |
| 2005/0108454 | A1* | 5/2005 | Baker .................. G06F 13/423 710/110 |
| 2010/0321466 | A1 | 12/2010 | Romá |
| 2012/0176472 | A1* | 7/2012 | Wu ....................... G06T 1/0007 348/E13.005 |
| 2014/0223090 | A1* | 8/2014 | Malone ............... G06F 13/4204 711/108 |
| 2014/0372642 | A1 | 12/2014 | Sengoku et al. |
| 2014/0372643 | A1* | 12/2014 | Sengoku ............. G06F 13/4282 710/105 |
| 2015/0220475 | A1* | 8/2015 | Amarilio ............. H04L 61/5038 710/104 |
| 2016/0020796 | A1 | 1/2016 | Hormati et al. |
| 2017/0048481 | A1 | 2/2017 | Ryu et al. |
| 2017/0220518 | A1* | 8/2017 | Sengoku ............... H04L 7/0331 |
| 2019/0141307 | A1* | 5/2019 | Youn ..................... H04N 23/62 |
| 2019/0258058 | A1 | 8/2019 | Fortin-Deschênes et al. |
| 2019/0291003 | A1* | 9/2019 | Perry .................... A63F 13/352 |
| 2022/0094818 | A1* | 3/2022 | Moriya ..................... G06T 1/20 |
| 2022/0138121 | A1* | 5/2022 | Chang ................. G06F 13/4282 710/5 |

FOREIGN PATENT DOCUMENTS

| | | |
|---|---|---|
| KR | 10-2013-0071419 | 6/2013 |
| KR | 10-2016-0018781 | 2/2016 |
| KR | 10-2017-0019136 | 2/2017 |
| WO | 2011/112165 | 9/2011 |
| WO | 2020/136285 | 7/2020 |

OTHER PUBLICATIONS

Valdez Jonathan et al, "Understanding the I 2 C Bus"; Jun. 1, 2015 (Jun. 1, 2015), XP093117593, Retrieved from the Internet: URL:https://www.ti.com/lit/an/slva704/slva.

Anonymous: "I2C—Wikipedia" , Aug. 23, 2020 (Aug. 23, 2020), XP093117586, Retrieved from the Internet: URL:https://web.archive.org/web/2020082314.

\* cited by examiner

ELECTRONIC DEVICE IN WHICH SIGNAL LINES OF CAMERA ARE REDUCED

CROSS-REFERENCE TO RELATED APPLICATIONS

This application is a continuation of International Application No. PCT/KR2021/010921, designating the U.S., filed on Aug. 18, 2021, in the Korean Intellectual Property Receiving Office, and claiming priority to Korean Patent Application No. 10-2020-0113851 filed on Sep. 7, 2020, and to Korean Patent Application No. 10-2021-0016338 filed on Feb. 4, 2021, in the Korean Intellectual Property Office, the disclosures of all of which are hereby incorporated by reference herein in their entireties.

BACKGROUND

Field

The disclosure relates to a technology of reducing signal lines between a camera and a processor.

Description of Related Art

Augmented reality (AR) refers to a technology of synthesizing virtual objects or information with a real environment such that the virtual objects or information appears as if it exists in a real environment. Augmented reality may be implemented through a head-mounted display (HMD) capable of being mounted on the user's head and directly providing an image in front of the user's eyes.

In the early days, the augmented reality market was based on the entertainment industry, such as games and videos, but recently, in line with the acceleration of mutual growth of related technologies and convergence between industries, tangible applications thereof to various industries such as medical care, education, shopping, and manufacturing have been produced. Accordingly, it is required to improve the portability of augmented reality (AR) glasses in order to provide augmented reality content in various environments.

Augmented reality glasses include multiple cameras, such as a gaze tracking camera for tracking the user's gaze, head cameras for obtaining images of the surrounding environment, and the like. With the recent development of augmented reality technology, the number of cameras mounted to the augmented reality glasses is increasing. In addition, the augmented reality glasses include an interface for providing image data obtained by a camera to a processor or providing the camera with data output from the processor to control the camera. In order to drive respective cameras included in the augmented reality glasses, an interface having 8 to 9 signal lines for each camera is required.

According to the conventional augmented reality glasses, there is a problem in which the volume occupied by signal lines is large in the augmented reality glasses because of a large number of signal lines to be mounted for driving the camera. Accordingly, it is difficult to mount necessary signal lines on the augmented reality glasses having a limited size, and implementation of a flexible printed circuit board (FPCB) is complicated. In addition, as the volume and number of necessary signal lines increase, the volume and weight of the augmented reality glasses also increase.

SUMMARY

An electronic device according to an example embodiment may include at least one camera, an encoder (comprising processing circuitry) connected, directly or indirectly, to the at least one camera through a first interface having a first number of signal lines, and a decoder connected, directly or indirectly, to the encoder through a second interface having a second number of signal lines, which is less than the first number. The encoder may provide data encoded based on data obtained from the at least one camera through the first interface and identification information indicating each of the first number of signal lines to the decoder through the second interface.

An operation method of an electronic device according to an example embodiment may include obtaining data by at least one camera included in the electronic device, providing, by the at least one camera, the data to an encoder included in the electronic device through a first interface having a first number of signal lines, performing encoding, by the encoder, based on the data and identification information indicating each of the first number of signal lines, and providing, by the encoder, the encoded data to a decoder included in the electronic device through a second interface having a second number of signal lines, which is less than the first number.

Augmented reality glasses according to an example embodiment may include at least one camera, a first codec connected, directly or indirectly, to the at least one camera through a first interface having a first number of signal lines, a second codec connected, directly or indirectly, to the first codec through a second interface having a second number of signal lines, which is less than the first number, and at least one processor connected, directly or indirectly, to the second codec through a third interface having a third number of signal lines, which is greater than the second number. In the case where the at least one camera provides data to the at least one processor, the first codec may provide data encoded based on data obtained from the at least one camera through the first interface and identification information indicating each of the first number of signal lines to the second codec through the second interface, and the second codec may decode the encoded data and provide the same to the at least one processor. In the case where the at least one processor provides data to the at least one camera, the second codec may provide data encoded based on data obtained from the at least one processor through the third interface and identification information indicating each of the third number of signal lines to the first codec through the second interface, and the first codec may decode the encoded data and provide the same to the at least one camera.

According to various example embodiment(s), it is possible to reducer a volume occupied by signal lines required to drive a plurality of cameras. Accordingly, it may be easy to mount a required number of signal lines in the augmented reality glasses having a limited size. In addition, the volume and/or weight of the augmented reality glasses may be reduced.

Effects obtainable in the disclosure are not limited to the effects mentioned above, and other effects not mentioned may be clearly understood by those skilled in the art to which the disclosure pertains from the description below.

BRIEF DESCRIPTION OF DRAWINGS

The above and other aspects, features and advantages of certain embodiments will be more apparent from the following detailed description, taken in conjunction with the accompanying drawings, in which.

DETAILED DESCRIPTION

Figure 1:
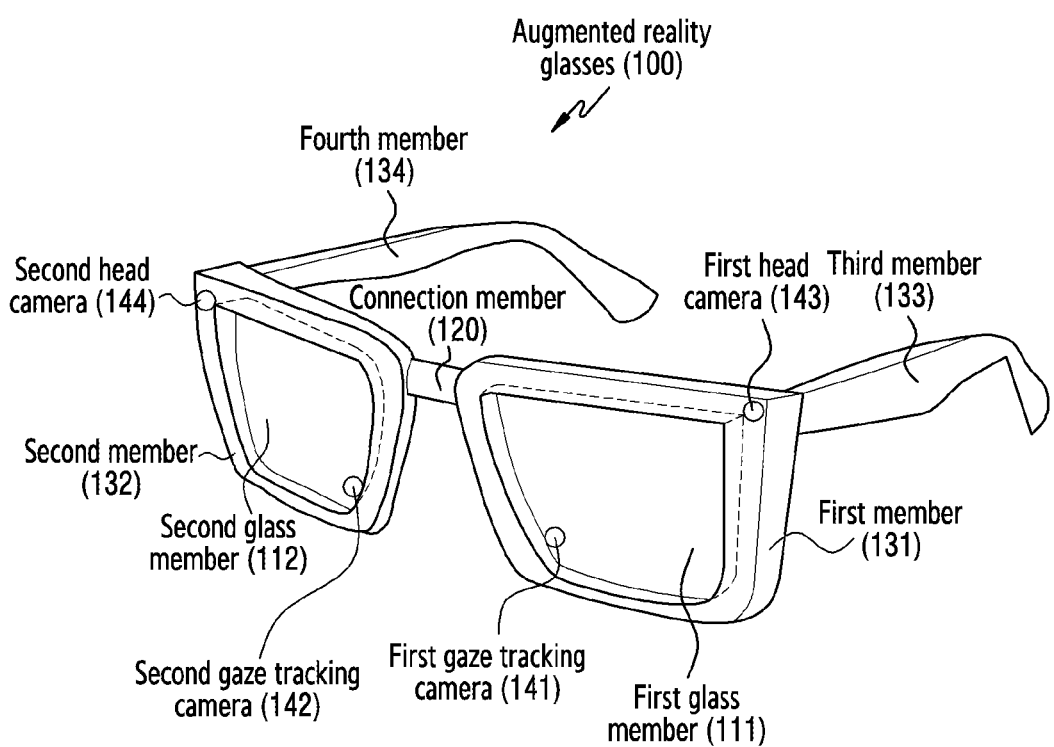
FIG. 1 illustrates a schematic view of augmented reality glasses according to an example embodiment.

FIG. 1 illustrates a schematic view of augmented reality glasses according to an embodiment.

Referring to FIG. 1, augmented reality (AR) glasses 100 may include a wearable electronic device that may be worn on a user. The augmented reality glasses 100 may be one of electronic devices including a near-to-eye display (NED) or a head-mounted display (HMD). The near-to-eye display may be understood as a type of display that has a display panel positioned very close to the user's eyes and may be worn on the user like glasses.

According to an embodiment, although various embodiments of this document describe augmented reality glasses 100 in the form of glasses as a main scenario, the disclosure is not limited thereto, and various embodiments of this document may be applied to various electronic devices including a near-to-eye display. For example, various embodiments of this document may be applied to augmented reality glasses in the form of an HMD device or goggles.

Referring to FIG. 1, the augmented reality glasses 100 may include a first glass member 111, a second glass member 112, a first support/frame member 131 adjacent to the first glass member 111, a second support/frame member 132 adjacent to the second glass member 112, a connection member 120 connecting the first support/member 131 and the second support/member 132, a third support/member 133 extending from the first member 131, and a fourth support/member 134 extending from the second member 132. In addition, the augmented reality glasses 100 may include a first gaze tracking camera 141 and a second gaze tracking camera 142 for tracking the user's gaze. The augmented reality glasses 100 may include a first head camera 143 and a second head camera 144 capable of obtaining images of a surrounding environment. In an embodiment, the first glass member 111, the first member 131, the third member 133, the first gaze tracking camera 141, and the first head camera 143 may be positioned on the left side with respect to the user wearing the augmented reality glasses 100. In another embodiment, the first glass member 111, the first member 131, the third member 133, the first gaze tracking camera 141, and the first head camera 143 may be positioned on the right side with respect to the user. Although description will be made based on the first glass member 111, the first member 131, the third member 133, the first gaze tracking camera 141, and the first head camera 143 positioned on the left side with respect to the user below, this is only for convenience of description, and it will be clearly understood by those skilled in the art that a symmetrical structure thereof is also possible.

According to an embodiment, the first glass member 111 and/or the second glass member 112 may be formed of a glass plate or a polymer and may be produce to be transparent or translucent.

According to an embodiment, the first member 131 is not limited to the shape shown in FIG. 1. For example, the first member 131 may have a shape surrounding at least a portion of the periphery of the first glass member 111. For example, the first member 131 may have a shape surrounding the upper end of the first glass member 111 or a shape surrounding the lower end of the first glass member 111. This may be equally applied to the second member 132.

According to an embodiment, the first member 121, the second member 132, and the connection member 120 may be integrally configured.

According to an embodiment, the third member 133 and the fourth member 134 may be understood as temples for supporting the augmented reality glasses 100 on the user's ears.

According to an embodiment, the third member 133 is not limited to the shape shown in FIG. 1. For example, the third member 133 may include a band shape that allows the augmented reality glasses 100 to be worn on the user's head. This may be equally applied to the fourth support member 134.

According to an embodiment, the connection member 120, the first member 131, the second member 132, the third support member 133, and the fourth member 134 may be integrally configured.

According to an embodiment, the first gaze tracking camera 141, the second gaze tracking camera 142, the first head camera 143, and the second head camera 144 may be disposed on at least one outer surface of an electronic device constituting the augmented reality glasses 100. For example, the first gaze tracking camera 141 and the first head camera 143 may be positioned on one outer surface of the first member 131, and the second gaze tracking camera 142 and the second head camera 144 may be positioned on one outer surface of the second member 132.

According to an embodiment, the first gaze tracking camera 141 and the second gaze tracking camera 142 may detect reflection light reflected from the user's eyes. For example, the augmented reality glasses 100 may obtain an image of the user's left eyeball through the first gaze tracking camera 141 and an image of the user's right eyeball through the second gaze tracking camera 142. The augmented reality glasses 100 may track the user's gaze using the eyeball images. For example, the augmented reality glasses 100 may obtain at least one image obtained using at least one of the first gaze tracking camera 141 and the second gaze tracking camera 142, and determine the user's gaze through the at least one image.

According to an embodiment, the first head camera 143 and the second head camera 144 may obtain an image of an external environment of the augmented reality glasses 100. For example, the augmented reality glasses 100 may obtain an image of an external object or person approaching the augmented reality glasses 100 through the first head camera 143 and the second head camera 144.

According to an embodiment, elements included in the augmented reality glasses 100 may not be limited to those shown in FIG. 1. For example, the augmented reality glasses 100 may further include a proximity sensor or contact sensor capable of detecting whether or not the user wears the augmented reality glasses 100.

Figure 2:
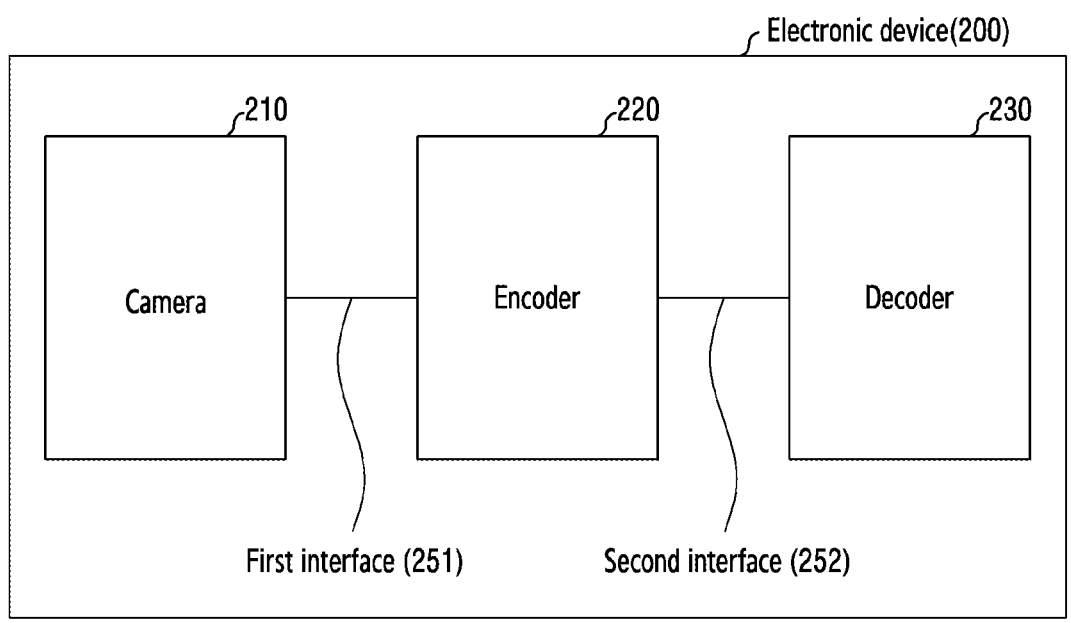
FIG. 2 is a block diagram illustrating the hardware configuration of an electronic device according to an example embodiment.

FIG. 2 is a block diagram illustrating the hardware configuration of an electronic device 200 according to an embodiment.

Referring to FIG. 2, the electronic device 200 may include a camera 210, an encoder 220 comprising processing circuitry, and a decoder 230 comprising processing circuitry. The camera 210 and the encoder 220 may be connected, directly or indirectly, through a first interface 251. In addition, the encoder 220 and the decoder 230 may be connected, directly or indirectly, through the second interface 252.

According to an embodiment, the electronic device 200 in FIG. 2 may correspond to the augmented reality glasses 100 described with reference to FIG. 1. In an embodiment, in the case where the electronic device 200 refers to the augmented reality glasses 100 described in FIG. 1, the camera 210 may be understood to include at least one of the first gaze tracking camera 141, the second gaze tracking camera 142, the first head camera 143, and the second head camera 144.

According to an embodiment, the camera 210 may be understood to indicate at least one of the gaze tracking camera and the head camera. In an embodiment, the gaze tracking camera and the head camera may be cameras of the same type having the same specification (e.g., pixels). In another embodiment, the gaze tracking camera and the head camera may be implemented as cameras of different specifications.

According to an embodiment, the camera 210 may obtain an image including an external environment of the electronic device 200 or an image of the user's eyeball. The camera 210 may provide image data corresponding to the image to the processor.

According to an embodiment, the encoder 220 may convert or process the form or format of data into another form or format for specific purposes. For example, the specific purpose may include the purpose of standardizing the form or format of data, the purpose of improving processing speed, the purpose of saving storage space, and the purpose of data security.

According to an embodiment, the encoder 220 may encode data obtained from the camera 210. For example, the data obtained from the camera 210 may be image data. The data encoded by the encoder 220 will be described later with reference to FIG. 8.

According to an embodiment, the decoder 230 may convert data encoded for a specific purpose into the data in the form or format prior to encoding.

According to an embodiment, the decoder 230 may decode the encoded data obtained from the encoder 220. For example, in the case where the encoder 220 encodes image data obtained from the camera 210 and provides the same to the decoder 230, the decoder 230 may decode the encoded data into the previous image data.

According to an embodiment, the first interface 251 may be an interface that has a first number of signal lines and connects the camera 210 and the encoder 220. For example, the first number may correspond to 8 or 9.

According to an embodiment, the second interface 252 may be an interface that has a second number of signal lines, which is less than the first number, and connects the encoder 220 and the decoder 230. For example, the second number may correspond to 2 or 4 less than the first number.

According to an embodiment, the second interface 252 may be an interface that transfers data in a differential signal method. The differential signal method may be a method in which the decoder 230 reads data from a difference value between signals transmitted through two signal lines. In an embodiment, in the case where the encoder 220 provides data to the decoder 230 in a differential signal method through the second interface 252, the second number may be understood as 2. In another embodiment, in the case where the encoder 220 separately provides a clock signal and data to the decoder 230 through the second interface 252, the second number may be understood as 4.

According to an embodiment, data transmitted through the second interface 252 may be data including an embedded clock signal. If the encoded data provided from the encoder 220 to the decoder 230 includes an embedded clock signal, the second interface 252 does not need to include a clock lane and a data lane, respectively, so the second number may be 2. The encoder 220 may add a separate operation for providing encoded data including an embedded clock signal to the decoder 230 through the second interface 252 during the encoding operation. For example, the encoder 220 may configure encoded data to recognize a clock signal.

Figure 3:
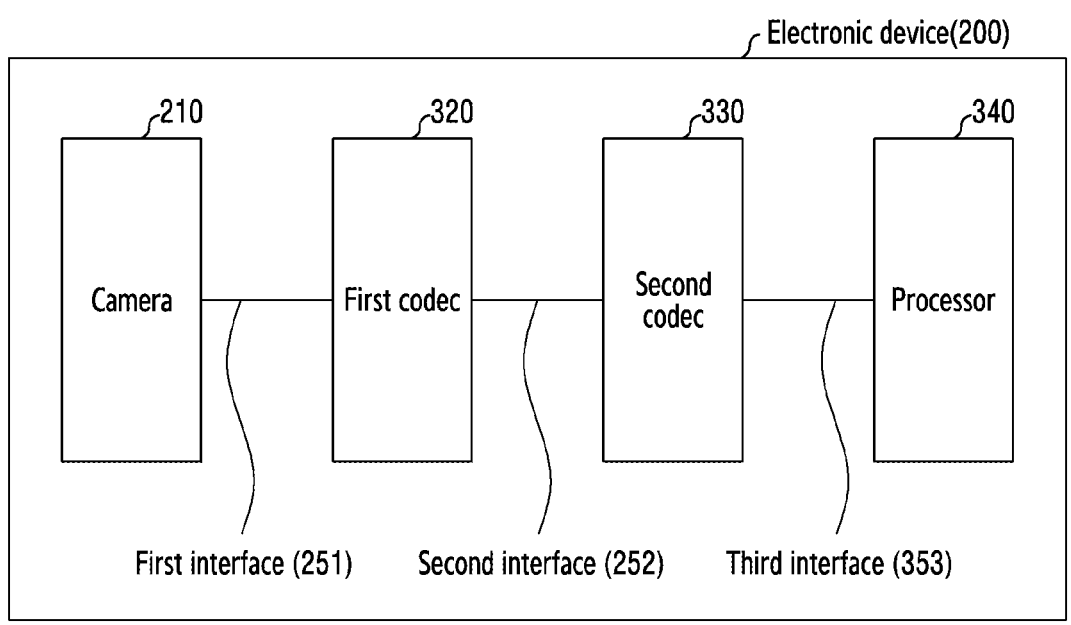
FIG. 3 is a block diagram illustrating the hardware configuration of an electronic device according to an example embodiment.

FIG. 3 is a block diagram illustrating the hardware configuration of an electronic device 200 according to an embodiment.

Referring to FIG. 3, the electronic device 200 may include a camera 210, a first codec 320 comprising circuitry, a second codec 330 comprising circuitry, a processor 340 comprising processing circuitry, a first interface 251 connecting the camera 210 and the first codec 320, a second interface 252 connecting the first codec 320 and the second codec 330, and a third interface 353 connecting the second codec 330 and the processor 340.

According to an embodiment, the camera 210 may provide the processor 340 with image data corresponding to the image described in FIG. 2 (e.g., an image including a surrounding environment and an image of the user's eyeball). In addition, the processor 340 may output a signal for controlling the camera 210. The camera 210 may change configuration (e.g., output mode, exposure time, and frames per second (FPS)) of the camera 210 according to a control signal provided from the processor 340.

According to an embodiment, the first codec 320 may include the encoder 220 shown in FIG. 2. The first codec 320 may perform the encoding operation described with reference to FIG. 2 and may also perform the decoding operation described with reference to FIG. 2. For example, if the camera 210 provides data to the first codec 320, the first codec 320 may perform an encoding operation, and if the second codec 330 encodes data provided from the processor 340 and provides the same to the first codec 320, the first codec 320 may perform a decoding operation.

According to an embodiment, the second codec 330 may include the decoder 230 shown in FIG. 2. The second codec 330 may perform the decoding operation described with reference to FIG. 2 and may also perform the encoding operation described with reference to FIG. 2. For example, if the first codec 320 encodes data provided by the camera 210 and provides the same to the second codec 330, the second codec 330 may perform a decoding operation, and if the processor 340 provides data to the second codec 330, the second codec 330 may perform an encoding operation.

According to an embodiment, the processor 340 may be understood to include at least one processor. For example, the processor 340 may include at least one of an application processor (AP), an image signal processor (ISP), and a communication processor (CP).

According to an embodiment, the processor 340 may receive image data from the camera 210 and process images. In addition, the processor 340 may analyze data (e.g., image data) provided from the camera 210 to determine whether or not to control the camera 210 and, if it is determined that the configuration of the camera 210 needs to be changed, transmit a control signal to the camera 210.

According to an embodiment, the processor 340 may be connected, directly or indirectly, to the second codec 330 and/or the decoder 230 through the third interface 353.

According to an embodiment, the third interface 353 may be an interface that has a third number of signal lines, which is greater than the second number, and connects the second codec 330 and the processor 340. In an embodiment, the third interface 353 may be understood as an interface connecting the decoder 230 and the processor 340.

According to an embodiment, the third number of signal lines of the third interface 353 may be the same as or less than the first number. For example, the third number may correspond to 6 or 8. In an embodiment, compared to the first interface 251 and the third interface 353, the second interface 252 may be an interface that has a relatively small second number (e.g., 2) of signal lines.

According to an embodiment, the first interface 251, the second interface 252, and the third interface 353 may be interfaces supporting bidirectional communication capable of transmitting data both in the direction in which data is transmitted from the camera 210 to the processor 340 and in the direction in which data is transmitted from the processor 340 to the camera 210. In another embodiment, at least one of the first interface 251, the second interface 252, and the third interface 353 may be an interface supporting unidirectional communication capable of transmitting data only in one of the direction in which data is transmitted from the camera 210 to the processor 340 and the direction in which data is transmitted from the processor 340 to the camera 210. In another embodiment, at least some of the signal lines included in the first interface 251, the second interface 252, and the third interface 353 may be interfaces supporting unidirectional communication capable of transmitting data only in the direction in which data is transmitted from the camera 210 to the processor 340, and the remaining thereof may be interfaces supporting unidirectional communication capable of transmitting data only in the direction in which data is transmitted from the processor 340 to the camera 210. In another embodiment, at least some of the signal lines included in the first interface 251, the second interface 252, and the third interface 353 may be interfaces supporting bidirectional communication, and the remaining thereof may be interfaces supporting unidirectional communication.

According to an embodiment, the first codec 320 (or the encoder 220) may include a clock generator or a phase locked loop (PLL). The first codec 320 (or the encoder 220) may provide a master clock (MCLK) to the camera 210 through the clock generator or PLL. Even if the camera 210 fails to directly receive a clock signal from the processor 340, it may receive a clock signal through the clock generator or PLL included in the first codec 320 (or the encoder 220).

Figure 4:
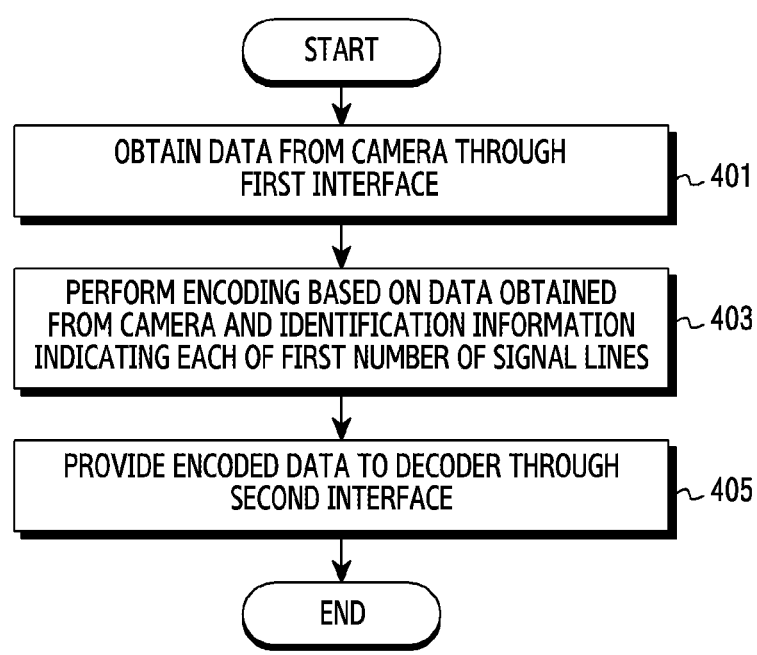
FIG. 4 is a flowchart illustrating the operation of an encoder according to an example embodiment.

FIG. 4 is a flowchart illustrating the operation of an encoder 220 according to an embodiment. The operation described in FIG. 4 may be performed by the encoder 220 shown in FIG. 2.

According to an embodiment, in operation 401, the encoder 220 may obtain data from the camera 210 through the first interface 251.

According to an embodiment, the camera 210 may provide the encoder 220 with image data corresponding to an image obtained by the camera 210 (e.g., an image including a surrounding environment or an image of the user's eyes). The encoder 220 may obtain image data from the camera 210 through the first interface 251. In an embodiment, the camera 210 may provide the encoder 220 with image data and configuration information of the image data.

According to an embodiment, in operation 403, the encoder 220 may perform encoding, based on the data obtained from the camera 210 and identification information indicating each of the first number of signal lines. The encoding operation of the encoder 220 will be described later with reference to FIG. 8.

According to an embodiment, in operation 405, the encoder 220 may provide encoded data to the decoder 230 through the second interface 252.

Figure 5:
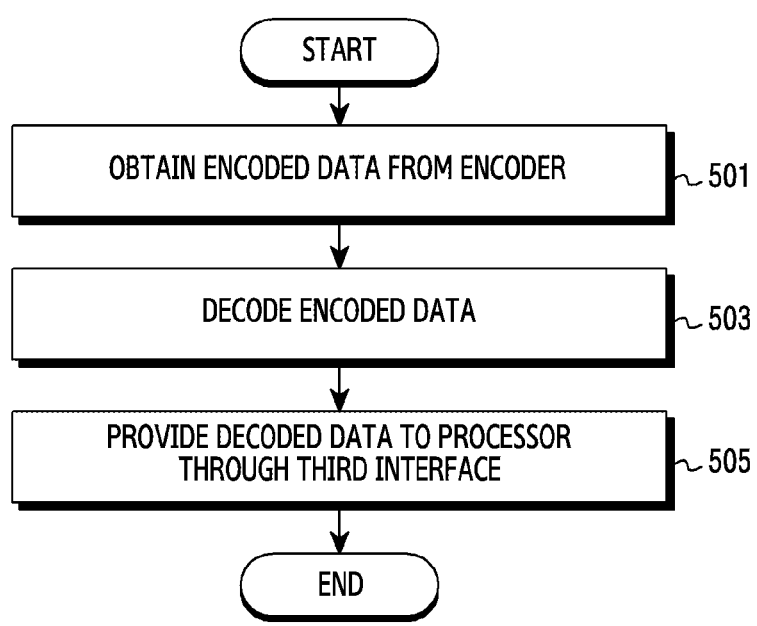
FIG. 5 is a flowchart illustrating the operation of a decoder according to an example embodiment.

FIG. 5 is a flowchart illustrating the operation of a decoder 230 according to an embodiment. The operation described in FIG. 5 may be performed by the decoder 230 shown in FIG. 2.

According to an embodiment, in operation 501, the decoder 230 may obtain encoded data from the encoder 220. The decoder 230 may obtain encoded data through the second interface 252.

According to an embodiment, in operation 503, the decoder 230 may decode the encoded data.

According to an embodiment, the decoder 230 may decode the encoded data provided from the encoder 220 to produce data in the same form or format as the image data output from the camera 210.

According to an embodiment, in operation 505, the decoder 230 may provide the decoded data to the processor 340 through the third interface 353.

According to an embodiment, the processor 340 may obtain the decoded data from the decoder 230. The processor 340 may obtain data in the same form or format as the image data output from the camera 210. In the case of obtaining image data from the camera 210 without passing through the encoder 220 and decoder 230 and in the case of obtaining image data through the encoder 220 and decoder 230 as shown in FIG. 5, the processor 340 may obtain data in the same form or format. Therefore, in performing the operation of the processor 340 (e.g., processing of image data, analysis of image data, and outputting a control signal for controlling the camera 210), there may be little or no difference between the presence and absence of the encoder 220 and the decoder 230.

Referring to FIGS. 4 and 5, in augmented reality glasses 100 (or an electronic device 200) including the encoder 220 performing the operation shown in FIG. 4 and the decoder 230 performing the operation shown in FIG. 5, the camera 210 and the processor 340 may not be directly connected through an interface. Augmented reality glasses (or an electronic device) that do not include the encoder 220 and the decoder 230 requires an interface having a first number of (e.g., 9) signal lines connecting a camera and a processor to provide data output from the camera to the processor. In augmented reality glasses (or an electronic device) having a limited volume, there is not enough space to mount an interface having a first number of (e.g., 9) signal lines between the camera and the processor for each of a plurality of cameras. Therefore, according to the disclosure, the augmented reality glasses 100 (or the electronic device 200) including the encoder 220 and the decoder 230 may reduce the volume occupied by the signal line inside the augmented reality glasses 100 through the second interface 252 having a second number of (e.g., 2) signal lines. In addition, it may be easy to mount a required number of signal lines within the augmented reality glasses 100 having a limited size, and the volume and weight of the augmented reality glasses 100 may be reduced.

Figure 6:
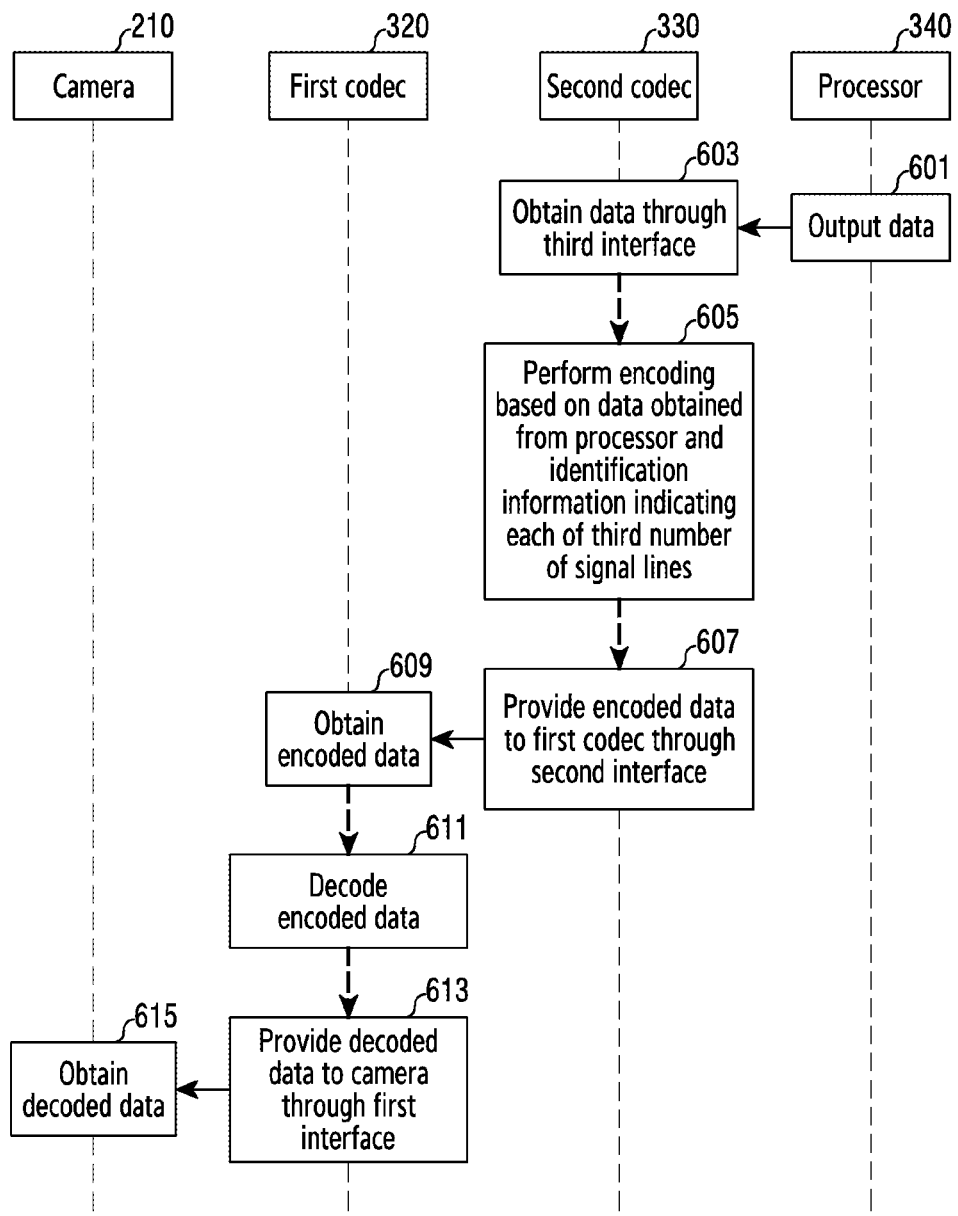
FIG. 6 is a flowchart illustrating operations of a processor, a first codec, and a second codec according to an example embodiment.

FIG. 6 is a flowchart illustrating operations of a processor 340, a second codec 330, and a first codec 320 according to an embodiment.

According to an embodiment, in operation 601, the processor 340 may output data to the second codec 330. For example, the processor 340 may output data including a control signal for controlling the camera 210.

According to an embodiment, in operation 603, the second codec 330 may obtain data through the third interface 353.

According to an embodiment, in operation 605, the second codec 330 may perform encoding, based on data obtained from the processor 340 and identification information indicating each of a third number of signal lines. The encoding operation of the second codec 330 will be described later with reference to FIG. 8.

According to an embodiment, in operation 607, the second codec 330 may provide encoded data to the first codec 320 through the second interface 252.

According to an embodiment, in operation 609, the first codec 320 may obtain the encoded data.

According to an embodiment, in operation 611, the first codec 320 may decode the encoded data.

According to an embodiment, in operation 613, the first codec 320 may provide the decoded data to the camera 210 through the first interface 251.

According to an embodiment, in operation 615, the camera 210 may obtain the decoded data.

According to an embodiment, the camera 210 may obtain data in the same form or format as the data output from the processor 340. For example, the camera 210 may obtain data output from the processor 340 and change the configuration of the camera 210 (e.g., output mode, exposure time, and frames per second (FPS)) according to a control signal included in the data.

According to an embodiment, in augmented reality glasses 100 (or the electronic device 200) including the second codec 330 performing operations 603 to 607 and the first codec 320 performing operations 609 to 613, the processor 340 and the camera 210 may not be directly connected through an interface. Augmented reality glasses (or an electronic device) that do not include the second codec 330 and the first codec 320 requires an interface having a first number of (e.g., 9) signal lines connecting the processor and the camera to provide data output from the processor to the camera. In augmented reality glasses (or an electronic device) having a limited volume, there is not enough space to mount an interface having a first number of (e.g., 9) signal lines between the camera and the processor for each of a plurality of cameras. Therefore, according to the disclosure, the augmented reality glasses 100 (or the electronic device 200) including the second codec 330 and the first codec 320 may reduce the volume occupied by the signal line inside the augmented reality glasses 100 through the second interface 252 having a second number of (e.g., 2) signal lines. In addition, it may be easy to mount a required number of signal lines within the augmented reality glasses 100 having a limited size, and the volume and weight of the augmented reality glasses 100 may be reduced.

Figure 7A:
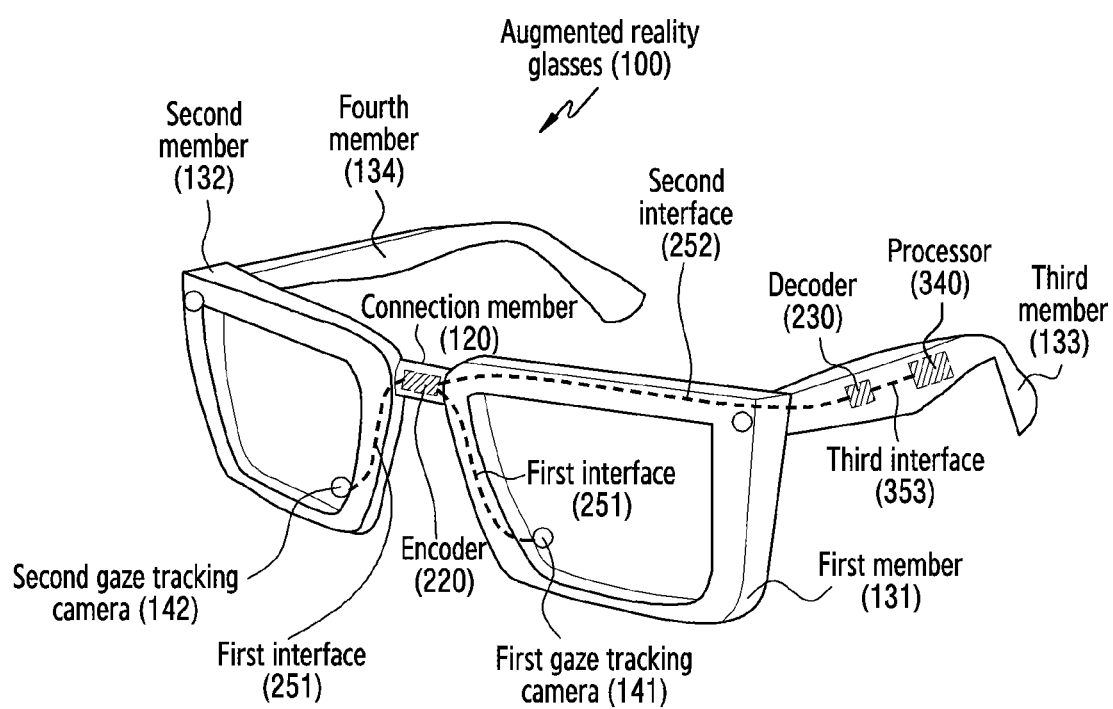
FIG. 7A illustrates a schematic view of augmented reality glasses including an interface connecting a gaze tracking camera and a processor according to an example embodiment.

FIG. 7A illustrates a schematic view of augmented reality glasses 100 including an interface connecting a gaze tracking camera 141 or 142 and a processor 340 according to an embodiment.

According to an embodiment, the camera 210 may include a first gaze tracking camera 141 and a second gaze tracking camera 142. The first gaze tracking camera 141 may obtain an image of the user's left eyeball, and the second gaze tracking camera 142 may obtain an image of the user's right eyeball.

According to an embodiment, the first gaze tracking camera 141 may be positioned on one outer surface of the first member 131, and the second gaze tracking camera 142 is positioned on one outer surface of the second member 132. For example, the first gaze tracking camera 141 and the second gaze tracking camera 142 may be disposed at a position facing the face of the user on one outer surface of the first member 131 and the second member 132 in order to obtain an image of the user's eyeballs. According to another embodiment, the first gaze tracking camera 141 and the second gaze tracking camera 142 may be positioned on one outer surface of the connection member 120. According to another embodiment, the first gaze tracking camera 141 may be positioned at a connection portion between the first member 131 and the connection member 120, and the second gaze tracking camera 142 may be positioned at a connection portion between the second member 132 and the connection member 120. In another embodiment, at least one of the first gaze tracking camera 141 and the second gaze tracking camera 142 may be positioned on one inner surface of the first member 131 or the second member 132 so as to be invisible from the outside.

According to an embodiment, the encoder 220 may be positioned inside the connection member 120, and the decoder 230 and the processor 340 may be positioned inside the third member 133. The encoder 220, the decoder 230, and the processor 340 may be positioned on one inner surface of each member so as to be invisible from the outside of the augmented reality glasses 100. In another embodiment, at least one of the encoder 220, the decoder 230, and the processor 340 may be positioned on one outer surface of the connection member 120 or the third member 133 so as to be visible from the outside of the augmented reality glasses 100.

According to an embodiment, the first interface 251 may have a minimum or small length for connecting the first gaze tracking camera 141 and the encoder 220, and may be positioned inside the first member 131 and the connection member 120. In another embodiment, the first interface 251 may have a length greater than a minimum or small length for connecting the first gaze tracking camera 141 and the encoder 220, and may be disposed at an appropriate position for arranging the first number of signal lines. In the same way, a first interface 251 for connecting the second gaze tracking camera 142 and the encoder 220 may be disposed.

According to an embodiment, the first interface 251 connecting the first gaze tracking camera 141 and the encoder 220 may be disposed to be symmetrical with the first interface 251 connecting the second gaze tracking camera 142 and the encoder 220. In another embodiment, the first interface 251 connecting the first gaze tracking camera 141 and the encoder 220 may be disposed not to be symmetrical with the first interface 251 connecting the second gaze tracking camera 142 and the encoder 220.

According to an embodiment, since the first interface 251 connecting the encoder 220 and the first gaze tracking camera 141 and connecting the encoder 220 and the second gaze tracking camera 142 includes a first number of (e.g., 9) signal lines, which is greater than a second number (e.g., 2), in order to minimize or reduce the volume occupied by the signal lines, the encoder 220 may be disposed at the center of the first gaze tracking camera 141 and the second gaze tracking camera 142. In another embodiment, the encoder 220 may be disposed at a position that is not the center of the first gaze tracking camera 141 and the second gaze tracking camera 142 but appropriate for connection with the first gaze tracking camera 141 and the second gaze tracking camera 142 through the first interface 251.

According to an embodiment, the second interface 252 may be positioned on one inner surface of the connection member 120, the first member 131, and the third member 133. For example, the second interface 252 may be connected, directly or indirectly, from the encoder 220 positioned on one inner surface of the connection member 120 of the augmented reality glasses 100 to the decoder 230 positioned on one inner surface of the third member 133 along one inner surface of the first member 131 while surrounding the upper end of the first glass member 111. As another example, the second interface 252 may be positioned along one inner surface of the first member 131 to surround the lower end of the first glass member 111.

According to an embodiment, the augmented reality glasses 100 may further include a hinge structure for connecting the first member 131 and the third member 133. In the case where the augmented reality glasses 100 include a hinge structure, it may be difficult to locate an interface having a large number (e.g., a first number or a third number) of signal lines inside the hinge structure. In an embodiment, since the second interface 252 having a second number of signal lines, which is less than the first number or the third number, is positioned inside the hinge structure in the augmented reality glasses 100, folding and bending operations of the third member 133 relative to the first member 131 may be possible.

According to an embodiment, the third interface 353 may be positioned on one inner surface of the third member 133 in order to connect the decoder 230 and the processor 340 positioned on one surface of the third member 133.

According to an embodiment, since the third interface 353 connecting the decoder 230 and the processor 340 has a third number of (e.g., 8) signal lines, which is greater than the second number (e.g., 2), in order to minimize or reduce the volume occupied by the signal lines, the decoder 230 may be disposed on one inner surface of the third member 133 so as to be adjacent to the processor 340.

According to an embodiment, since the second interface 252 has a second number of (e.g., 2) signal lines less than that of the first interface 251 or the third interface 353, compared to the case where the first gaze tracking camera 141 and the processor 340 are directly connected through an interface having a first number of (e.g., 9) signal lines and where the second gaze tracking camera 142 and the processor 340 are directly connected through an interface having a first number of (e.g., 9) signal lines, it is possible to reduce the volume occupied by the signal lines required by the augmented reality glasses 100 of the disclosure. Accordingly, it may be easy to mount signal lines within the augmented reality glasses 100 having a limited size. In addition, the volume and weight of the augmented reality glasses 100 may be reduced.

Figure 7B:
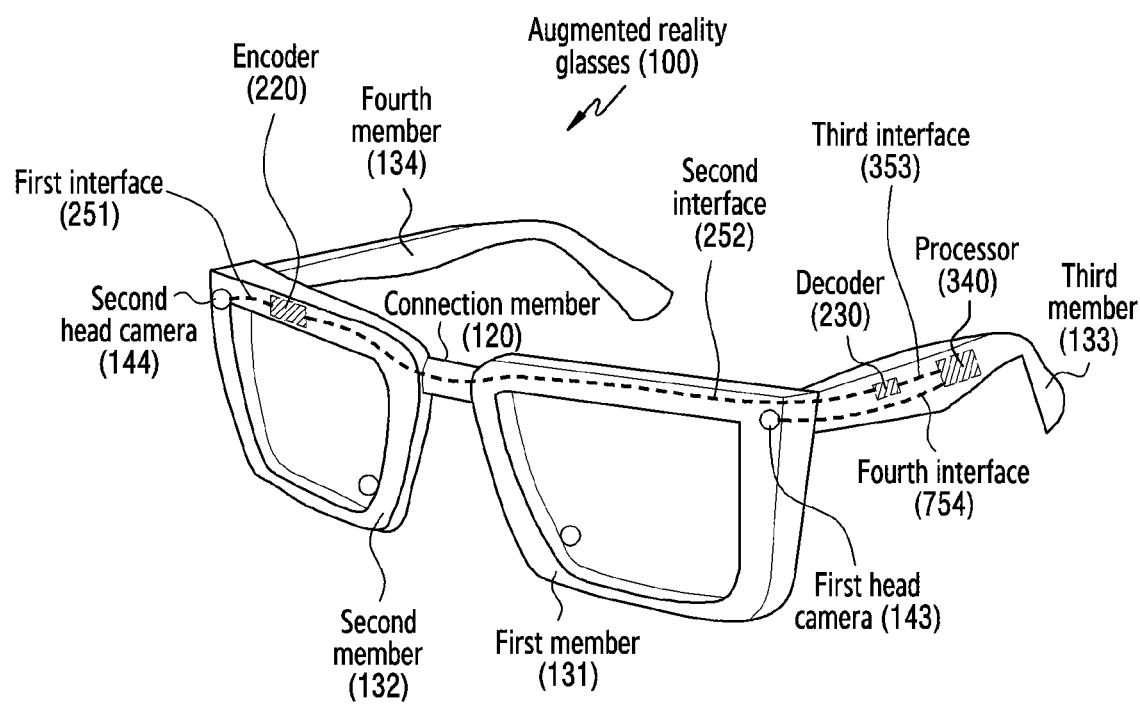
FIG. 7B illustrates a schematic view of augmented reality glasses including an interface connecting a head camera and a processor according to an example embodiment.

FIG. 7B illustrates a schematic view of augmented reality glasses 100 including an interface connecting a head camera 143 or 144 and a processor 340 according to an embodiment.

According to an embodiment, the augmented reality glasses 100 may include a first head camera 143, and the camera 210 may include a second head camera 144. The first head camera 143 and the second head camera 144 may obtain an image of the surrounding environment of the augmented reality glasses 100 (e.g., an image including a subject existing outside the augmented reality glasses 100).

According to an embodiment, the first head camera 143 may be positioned on one outer surface of the first member 131, and the second head camera 144 may be positioned on one outer surface of the second member 132. For example, the first head camera 143 and the second head camera 144 may be positioned on the opposite surface of the surface facing the user, among the outer surfaces of the first member 131 and the second member 132, which is suitable for obtaining an image of the surrounding environment. According to another embodiment, the first head camera 143 may be positioned on one outer surface of the third member 133, and the second head camera 144 may be positioned on one outer surface of the fourth member 134. According to another embodiment, the first head camera 143 may be positioned at a connection portion between the first member 131 and the third member 133, and the second head camera 144 may be positioned at a connection portion between the second member 132 and the fourth member 134. In another embodiment, at least one of the first head camera 143 and the second head camera 144 may be positioned on one inner surface of the first member 131 or the second member 132 so as to be invisible from the outside of the augmented reality glasses 100.

According to an embodiment, the encoder 220 may be positioned inside the second member 132, and the decoder 230 and the processor 340 may be positioned inside the third member 133. The encoder 220, the decoder 230, and the processor 340 may be positioned on one inner surface of each member so as to be invisible from the outside of the augmented reality glasses 100. In another embodiment, at least one of the encoder 220, the decoder 230, and the processor 340 may be positioned on one outer surface of the second member 132 or the third member 133 so as to be visible from the outside of the augmented reality glasses 100.

According to an embodiment, the first interface 251 may have a minimum or small length required to connect the second head camera 144 and the encoder 220 and may be positioned inside the second member 132. In another embodiment, the first interface 251 may have a length greater than a minimum or small length for connecting the second head camera 144 and the encoder 220, and may be disposed at an appropriate position for arranging the first number of signal lines.

According to an embodiment, since the first interface 251 connecting the encoder 220 and the second head camera 144 includes a first number of (e.g., 9) signal lines, which is greater than a second number (e.g., 2), in order to minimize or reduce the volume occupied by the signal lines, the encoder 220 may be disposed on one inner surface of the second member 132 so as to be adjacent to the second head camera 144.

According to an embodiment, the second interface 252 may be positioned on one inner surface of the second member 132, the connection member 120, the first member 131, and the third member 133. For example, the second interface 252 may be connected, directly or indirectly, from the encoder 220 positioned on, directly or indirectly, one inner surface of the second member 132 of the augmented reality glasses 100 to the decoder 230 positioned on, directly or indirectly, one inner surface of the third member 133 along one inner surface of the second member 132 and the first member 131 and one inner surface of the connection member 120 while surrounding the upper ends of the second glass member 112 and the first glass member 111. As another example, the second interface 252 may be positioned on, directly or indirectly, one inner surface of the second member 132 and the first member 131 and on one inner surface of the connection member 120 and the third member 133 so as to surround a lower end of at least one glass member of the second glass member 112 and the first glass member 111.

According to an embodiment, the augmented reality glasses 100 may further include a hinge structure on at least one of the inside of the connection member 120 or the portion between the first member 131 and the third member 133. In the case where the augmented reality glasses 100 include a hinge structure, it may be difficult to locate an interface having a large number (e.g., the first number or the third number) of signal lines inside the hinge structure. In an embodiment, since the second interface 252 having a second number of signal lines, which is less than the first number or the third number, is positioned inside the hinge structure in the augmented reality glasses 100, folding and bending operations of the second member 132 or third member 133 relative to the first member 131 may be possible.

According to an embodiment, the third interface 353 may be positioned on, directly or indirectly, one inner surface of the third member 133 to connect the decoder 230 and the processor 340 positioned on, directly or indirectly, one inner surface of the third member 133.

According to an embodiment, a fourth interface 754 may be positioned on, directly or indirectly, one inner surface of the first member 131 and the third member 133 to connect the first head camera 143 and the processor 340. Unlike the second head camera 144, it is efficient to directly connect the first head camera 143 to the processor 340 without passing through the encoder 220 and the decoder 230 to reduce the volume occupied by the signal lines and arranged the signal lines, so the first head camera 143 may be directly connected to the processor 340 through the fourth interface 754.

According to an embodiment, the processor 340 may obtain data provided by the first head camera 143 through the fourth interface 754 and obtain data provided by the second head camera 144 through the first interface 251, the encoder 220, the second interface 252, the decoder 230, and the third interface 353.

According to an embodiment, in the case where the augmented reality glasses 100 include the encoder 220 and the decoder 230 between the processor 340 and the second head camera 144, and include the second interface 252 having a second number of (e.g., 2) signal lines between the encoder 220 and the decoder 230, the volume occupied by signal lines disposed inside the augmented reality glasses 100 may be reduced. In addition, in the case where the augmented reality glasses 100 do not include the encoder 220 and the decoder 230 between the processor 340 and the first head camera 143 and include the fourth interface 754, since the distance between the processor 340 and the first head camera 143 is relatively short, the signal lines may be mounted more efficiently, compared to arranging the encoder 220 and the decoder 230.

Referring to FIGS. 7A and 7B together, the augmented reality glasses 100 may include an encoder 220 connected, directly or indirectly, to the first gaze tracking camera 141 and the second gaze tracking camera 142, and an encoder 220 connected, directly or indirectly, to the second head camera 144, respectively. In an embodiment, the augmented reality glasses 100 may include a single decoder 230 connected to both of the two encoders 220. In another embodiment, the augmented reality glasses 100 may include two decoders 230 respectively connected to the two encoders.

According to an embodiment, the augmented reality glasses 100, unlike that shown in FIG. 7B, may include a single encoder 220 that is connected, directly or indirectly, to the first gaze tracking camera 141, the second gaze tracking camera 142, and the second head camera 144, respectively, through the interface 251 and positioned on, directly or indirectly, an inner surface of the connection member 120. In an embodiment, the augmented reality glasses 100 may include one decoder 230 connected, directly or indirectly, to the one encoder 220.

According to an embodiment, the positions and arrangements of the camera 210, the encoder 220, the decoder 230, the processor 340, the first interface 251, the second interface 252, the third interface 353, and the fourth interface 754 shown in FIGS. 7A and 7B are only examples, and various types of positions and arrangements that may be clearly understood by those skilled in the art are possible.

According to an embodiment, in FIGS. 7A and 7B, the encoder 220 may be understood as the first codec 320, and the decoder 230 may be understood as the second codec 330.

Referring to FIGS. 7A and 7B together, according to an embodiment, the length of the second interface 252 may be greater than the length of the third interface 353, and the distance between the encoder 220 and the decoder 230 may be greater than the distance between the decoder 230 and the processor 340. Among the sections requiring interfaces inside the augmented reality glasses 100, the sections connected through the first interface 251 and the third interface 353 having a number of signal lines greater than the second number may be minimized or reduced, and most of the sections may be connected through the second interface 252 having the second number of (e.g., 2) signal lines, thereby reducing the volume occupied by the signal lines inside the augmented reality glasses 100.

Figure 8:
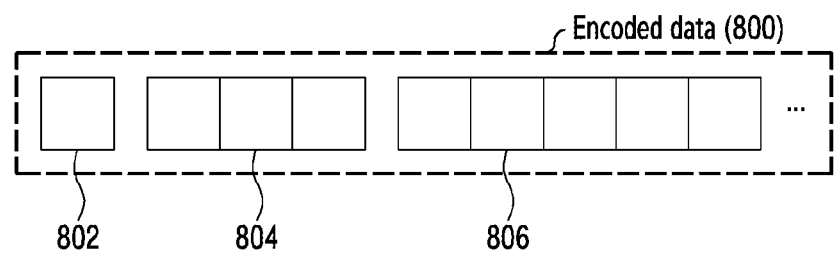
FIG. 8 illustrates data encoded by an encoder according to an example embodiment.

FIG. 8 illustrates data encoded by an encoder 220 according to an embodiment. The encoding described in relation to FIG. 8 may be performed by the encoder 220 shown in FIG. 2 or the second codec 330 shown in FIG. 3.

According to an embodiment, the encoder 220 may produce encoded data 800, based on data obtained from the camera 210 through the first interface 251 and identification information indicating each of the first number of signal lines.

According to an embodiment, the second codec 330 may produce encoded data 800, based on data obtained from the processor 340 through the third interface 353 and identification information indicating each of the third number of signal lines.

According to an embodiment, the encoded data 800 may include data 802 on transmission direction, data 804 on identification information indicating each signal line, and data 806 obtained from the camera 210 or the processor 340.

According to an embodiment, the data 802 on transmission direction may be data having 1 bit. For example, in the case of data transmitted from the camera 210 to the processor 340, the data 802 on transmission direction may have a value "1", and in the case of data transmitted from the processor 340 to the camera 210, the data 802 on transmission direction may have a value "0".

According to an embodiment, the data 804 on identification information indicating each signal line may indicate the type of signal line included in the first interface 251 or the type of signal line included in the third interface 353. For example, in the case where the camera 210 includes the first gaze tracking camera 141 and the second gaze tracking camera 142, the first interface 251 and the third interface 353 may include 8 types of signal lines such as a first mobile industry processor interface (MIPI), a first inter-integrated circuit (I2C), a first VSYNC, a first RESET, a second MIPI, a second I2C, a second VSYNC, and a second RESET. In the case where the first interface 251 or the third interface 353 includes 8 types of signal lines, the data 804 on identification information may be data having 3 bits. For example, the data 804 on identification information may have values shown in Table 1.

TABLE 1

| Data on identification information | | | Type of signal line |
|---|---|---|---|
| 0 | 0 | 0 | First MIPI |
| 0 | 0 | 1 | First I2C |
| 0 | 1 | 0 | First VSYNC |
| 0 | 1 | 1 | First RESET |
| 1 | 0 | 0 | Second MIPI |
| 1 | 0 | 1 | Second I2C |
| 1 | 1 | 0 | Second VSYNC |
| 1 | 1 | 1 | Second RESET |

According to an embodiment, the data 806 may be data 806 obtained from the camera 210 or data 806 obtained from the processor 340. For example, in the case where the encoder 220 encodes data provided from the camera 210 to the encoder 220, the encoded data 800 may include data 806 obtained from the camera 210. For another example, in the case where the second codec 330 encodes data provided from the processor 340 to the second codec 330, the encoded data 800 may include data 806 obtained from the processor 340.

According to an embodiment, the decoder 230 or the first codec 320 may decode the encoded data 800. For example, the decoder 230 may decode the encoded data 800 provided from the encoder 220 and provide the data 806 obtained from the camera 210 to the processor 340. As another example, the first codec 320 may decode the encoded data 800 provided from the second codec 330 and provide the data 806 obtained from the processor 340 to the camera 210.

For example, when image data output by the camera 210 is provided to the encoder 220 through a signal line of a first MIPI of the first interface 251, the encoder 220 may encode the same into the form of "1+000+data 806", in which the data 802 on transmission direction has a value "1" and the data 804 on identification information has a value "000" (see Table 1), including the data 806 obtained from the camera 210, and provide the encoded data 800 to the decoder 230. If the encoded data 800 provided from the encoder 220 to the decoder 230 is "1+000+data 806", the decoder 230 may decode the encoded data 800 and provide the data 806 (e.g., an image) to the processor 340 through a first MIPI signal line of the third interface 353.

For example, when control signal data output by the processor 340 is provided to the second codec 330 through a signal line of a second I2C of the third interface 353, the second codec 330 may encode the same into the form of "0+101+data 806", in which the data 802 on transmission direction has a value "0" and the data 804 on identification information has a value "101" (see Table 1), including the data 806 obtained from the processor 340, and provide the encoded data 800 to the first codec 320. If the encoded data 800 provided from the second codec 330 to the first codec 320 is "0+101+data 806", the first codec 320 may decode the encoded data 800 and provide the data 806 (e.g., a control signal) to the camera 210 through a second I2C signal line of the first interface 251.

Figure 9:
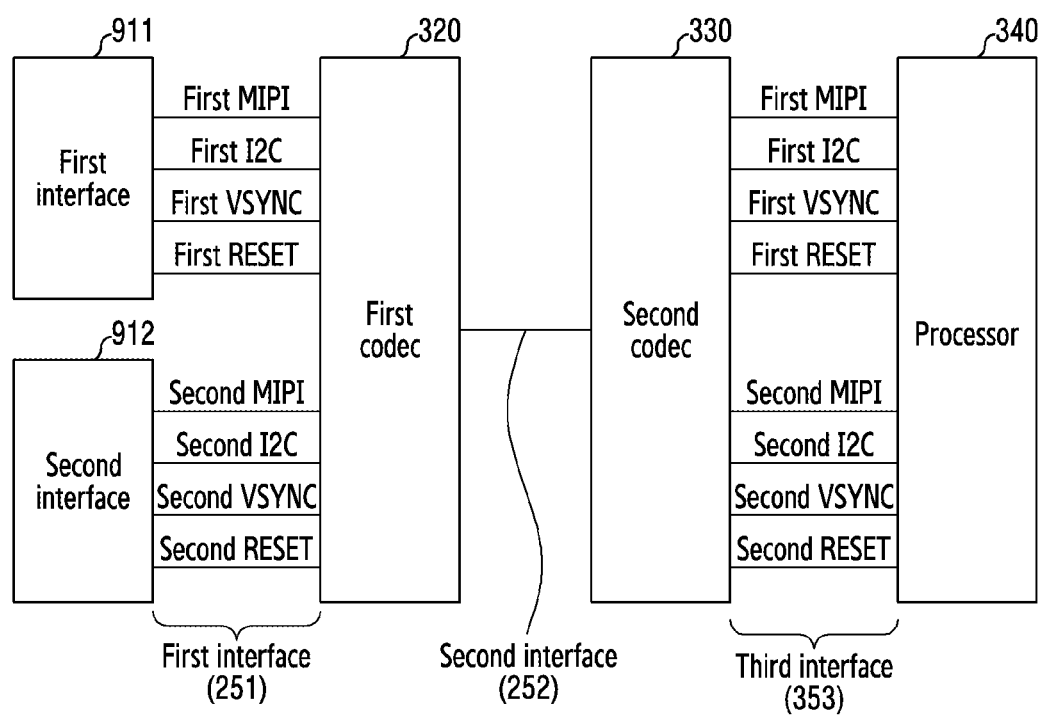
FIG. 9 illustrates signal line types of a first interface and a third interface according to an example embodiment.
Figure 10:
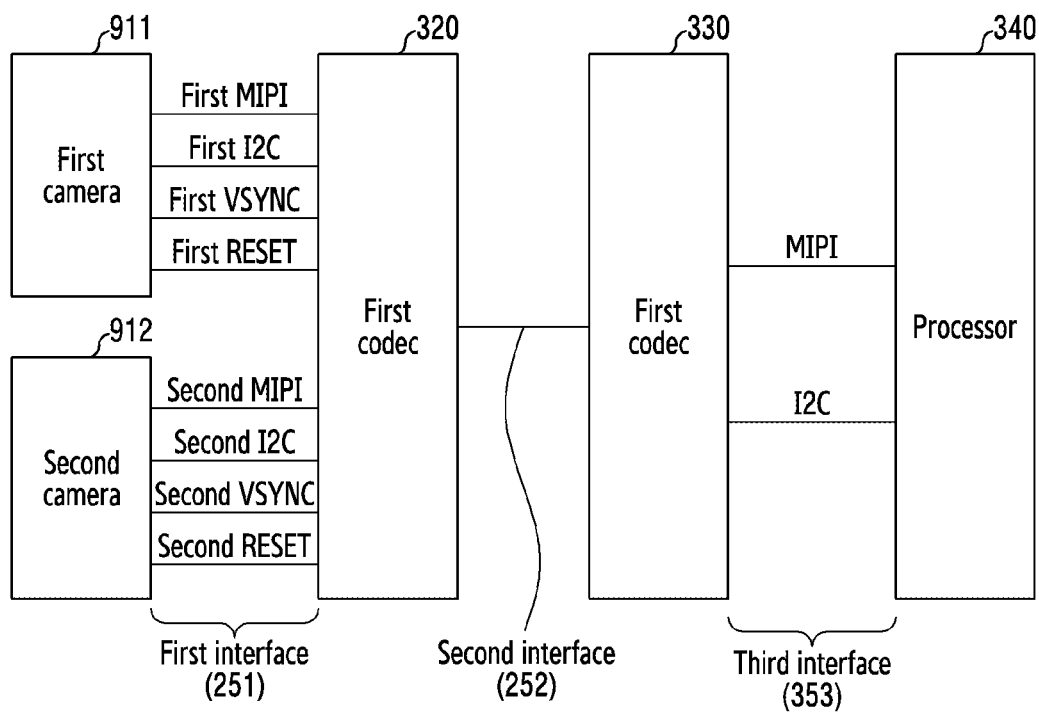
FIG. 10 illustrates signal line types of a first interface and a third interface according to an example embodiment.
Figure 11:
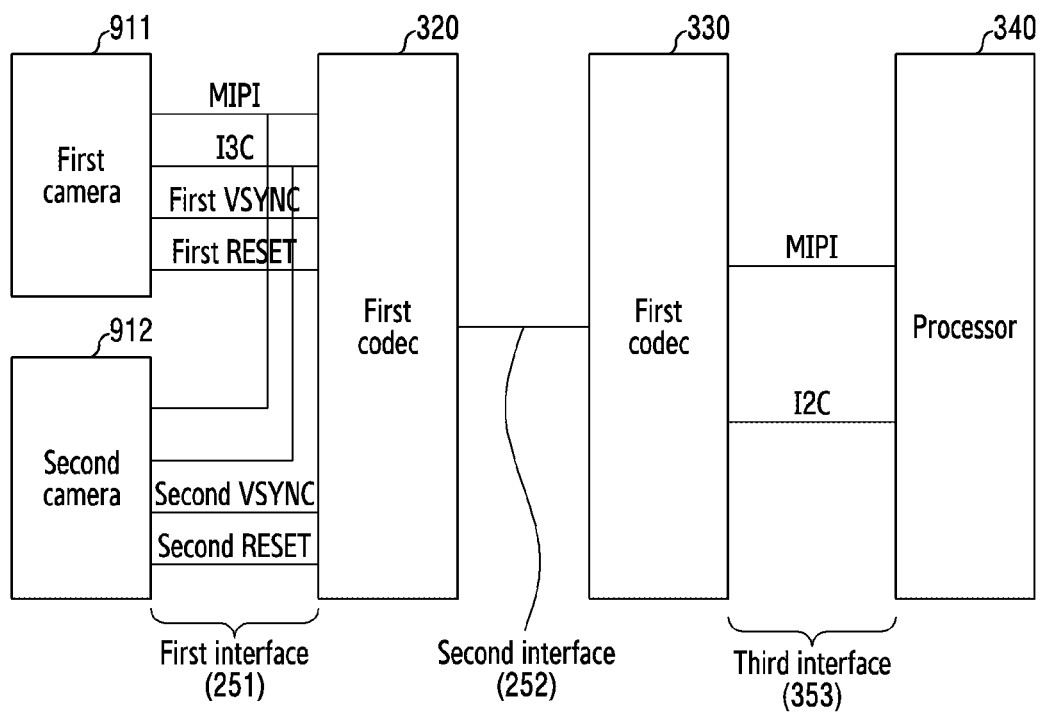
FIG. 11 illustrates signal line types of a first interface and a third interface according to an example embodiment.

FIGS. 9 to 11 illustrate signal line types of the first interface 251 and the third interface 353 according to an embodiment.

According to an embodiment, the second interface 252 in FIGS. 9 to 11 may be an interface that transmits data in a differential signal method or may be an interface that transmits data including an embedded clock. Referring to the description with respect to FIG. 2, the second number may be understood as 2. Hereinafter, the first interface 251 and the third interface 353 will be described.

According to an embodiment, the camera 210 in FIGS. 9 to 11 may include a first camera 911 and a second camera 912. For example, the first camera 911 may be the first gaze tracking camera 141 and the second camera 912 may be the second gaze tracking camera 142.

According to an embodiment, the augmented reality glasses 100 (or the electronic device 200) may require an interface that includes mobile industry processor interface (MIPI), inter-integrated circuit (I2C), VSYNC, and RESET signal lines for each camera 210. MIPI may have 4 signal lines, I2C may have 2 signal lines, VSYNC may have one signal line, and RESET may have one signal line. The interface may further include MCLK having one signal line. Therefore, an interface having 8 to 9 signal lines for each camera 210 may be required. Hereinafter, in the case where the encoder 220 or the second codec 330 performs an encoding operation, types of signal lines will be described in relation to the data on identification information (e.g., 804 shown in FIG. 8).

FIG. 9 illustrates signal line types of the first interface 251 and the third interface 353 according to an embodiment.

According to an embodiment, the augmented reality glasses 100 (or the electronic device 200) may include a first interface 251 and a third interface 353 having 8 types of signal lines.

According to an embodiment, the first interface 251 may include a first MIPI, a first I2C, a first VSYNC, and a first RESET for connecting a first camera 911 and the first codec 320, and a second MIPI, a second I2C, a second VSYNC, and a second RESET for connecting a second camera 912 and the first codec 320. Accordingly, the first interface 251 may be an interface having 8 types of signal lines such as a first MIPI, a first I2C, a first VSYNC, a first RESET, a second MIPI, a second I2C, a second VSYNC, and a second RESET.

According to an embodiment, the third interface 353 may be an interface having 8 types of signal lines such as a first MIPI, a first I2C, a first VSYNC, a first RESET, a second MIPI, a second I2C, a second VSYNC, and a second RESET for connecting the second codec 330 and the processor 340. The types of signal lines of the third interface 353 may correspond to the types of signal lines of the first interface 251.

According to an embodiment, the type of signal line through which data is transferred in the first interface 251 may match the type of signal line through which data is transferred in the third interface 353. For example, data provided from the first camera 911 to the first codec 320 through the first MIPI of the first interface 251 may be provided by the second codec 330 to the processor 340 through the first MIPI of the third interface 353. For another example, data provided from the processor 340 to the second codec 330 through the second I2C of the third interface 353 may be provided to the second camera 912 by the first codec 320 through the second I2C of the first interface 251.

FIG. 10 illustrates signal line types of the first interface 251 and the third interface 353 according to another embodiment.

According to an embodiment, the augmented reality glasses 100 (or the electronic device 200) may include a first interface 251 having 8 types of signal lines and a third interface 353 having 2 types of signal lines.

According to an embodiment, the first interface 251 may be configured in the same manner as the first interface 251 described in FIG. 9.

According to an embodiment, the third interface 353 may be an interface having two types of signal lines such as an MIPI and an I2C connecting the second codec 330 and the processor 340.

According to an embodiment, data provided by the first camera 911 and/or the second camera 912 to the first codec 320 through the first MIPI and/or the second MIPI of the first interfaces 251 may be provided by the second codec 330 to the processor 340 through the MIPI signal line of the third interface 353.

According to an embodiment, when the processor 340 provides data to the second codec 330 through the I2C of the third interface 353, the processor 340 may output data in the form of a command. In the case where the processor 340 outputs data in the form of a command, the third interface 353 includes a single type of I2C signal line, instead of signal lines such as a first I2C, a first VSYNC, a first RESET, a second I2C, a second VSYNC, and a second RESET. Data provided in the form of a command by the processor 340 to the second codec 330 through the I2C of the third interfaces 353 may be provided from the first codec 320 to the first camera 911 or the second camera 912. For example, in the case where the processor 340 provides data of "address+0x01" to the second codec 330 through the I2C of the third interfaces 353, the first codec 320 may provide data to the first camera 911 through the first RESET of the first interface 251. For another example, in the case where the processor 340 provides data of "address+0x03" to the second codec 330 through the I2C of the third interfaces 353, the first codec 320 may provide data to the second camera 912 through the second VSYNC of the first interface 251.

According to an embodiment, as the processor 340 provides the second codec 330 with data in the form of commands, the types and number of signal lines of the third interface 353 may be reduced. If the number of signal lines included in the third interface 353 is reduced, it may be easier to mount the signal lines inside the augmented reality glasses 100, and the volume and weight of the augmented reality glasses 100 may be further reduced.

FIG. 11 illustrates signal line types of the first interface 251 and the third interface 353 according to another embodiment.

According to an embodiment, the augmented reality glasses 100 (or the electronic device 200) may include a first interface 251 having 6 types of signal lines and a third interface 353 having 2 types of signal lines.

According to an embodiment, the third interface 353 may have the same configuration as the third interface 353 described in FIG. 10.

According to an embodiment, the first interface 251 may be an interface having six types of signal lines such as an MIPI, an improved inter-integrated circuit (I3C), a first VSYNC, a first RESET, a second VSYNC, and a second RESET for connecting the first camera 911 and the second camera 912 and the first codec 320.

According to an embodiment, the first camera 911 and the second camera 912 may share the MIPI signal line of the first interface 251. The MIPI signal line may be understood as a MIPI virtual channel.

According to an embodiment, in the case where an image sensor included in the first camera 911 and an image sensor included in the second camera 912 support a multi-drop function, the first camera 911 and the second camera 912 may share the MIPI signal line of the first interface 251. In an embodiment, the multi-drop function supported by the image sensor may be understood as a function capable of processing multiple signals using a single line.

According to an embodiment, the first camera 911 and the second camera 912 may share an I3C signal line of the first interface 251. Even in the case where an I2C ID of the image sensor included in the first camera 911 is the same as an I2C ID of the image sensor included in the second camera 912, the I3C signal line may allocate a dynamic ID to the image sensors. Therefore, compared to the case in which the first interface 251 separately includes the first I2C and the second I2C in FIG. 9 or 10, the types and number of signal lines included in the first interface 251 may be reduced.

According to an embodiment, if the image sensor included in the first camera 911 and the image sensor included in the second camera 912 have different I2C IDs, the first interface 251 may include an I2C signal line, instead of the I3C signal line. The first camera 911 and the second camera 912 may share the I2C signal line included in the first interface 251.

According to an embodiment, if the image sensor included in the first camera 911 and the image sensor included in the second camera 912 support the multi-drop function, the first camera 911 and the second camera 912 may share the I3C signal line of the first interface 251.

According to an embodiment, as the first camera 911 and the second camera 912 share the MIPI signal line and the I3C signal line of the first interface 251, the types and the number of signal lines of the first interface 251 may be reduced. If the number of signal lines included in the first interface 251 is reduced, it may be easier to mount the signal lines inside the augmented reality glasses 100, and the volume and weight of the augmented reality glasses 100 may be further reduced.

Figure 12:
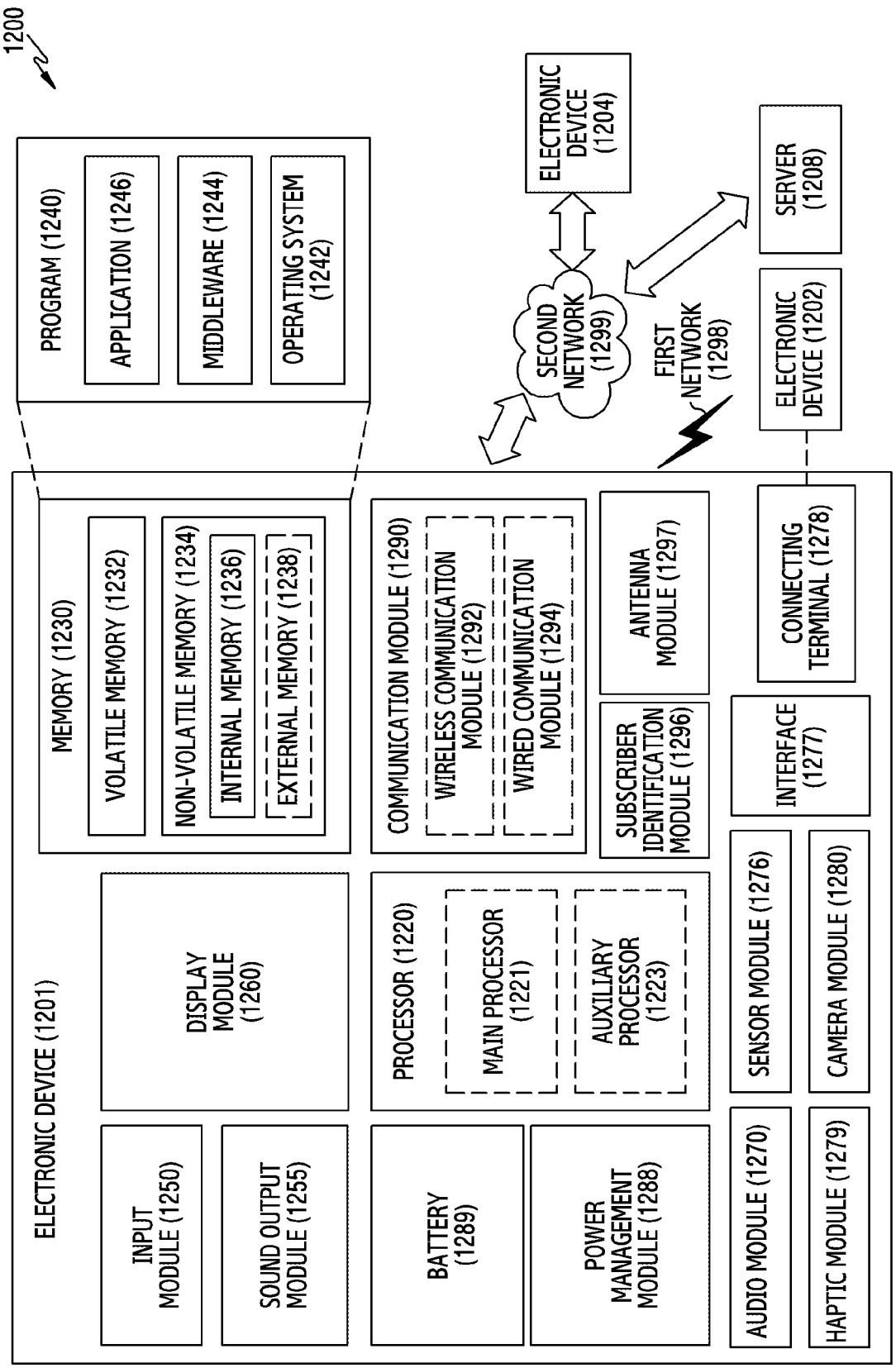
FIG. 12 is a block diagram of an electronic device in a network environment according to various example embodiments.

FIG. 12 is a block diagram illustrating an electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module(SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to an embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thererto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to an embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In another embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 13:
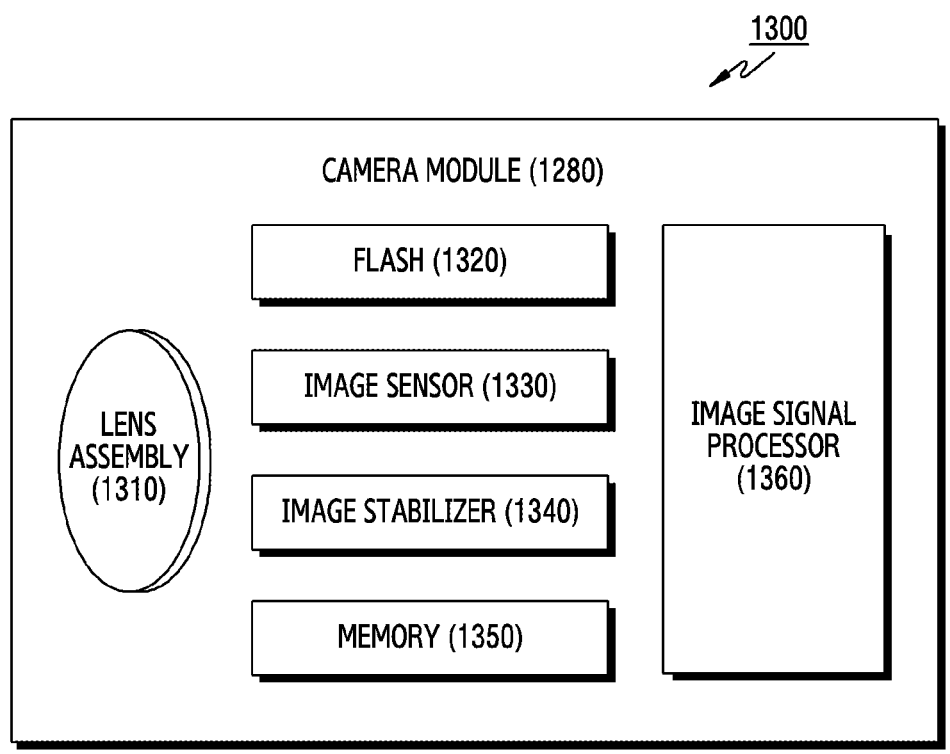
FIG. 13 is a block diagram illustrating a camera module according to various example embodiments.

FIG. 13 is a block diagram 1300 illustrating the camera module 1280 according to various embodiments. Referring to FIG. 13, the camera module 1280 may include a lens assembly 1310, a flash 1320, an image sensor 1330, an image stabilizer 1340, memory 1350 (e.g., buffer memory), or an image signal processor 1360. The lens assembly 1310 may collect light emitted or reflected from an object whose image is to be taken. The lens assembly 1310 may include one or more lenses. According to an embodiment, the camera module 1280 may include a plurality of lens assemblies 1310. In such a case, the camera module 1280 may form, for example, a dual camera, a 360-degree camera, or a spherical camera. Some of the plurality of lens assemblies 1310 may have the same lens attribute (e.g., view angle, focal length, auto-focusing, f number, or optical zoom), or at least one lens assembly may have one or more lens attributes different from those of another lens assembly. The lens assembly 1310 may include, for example, a wide-angle lens or a telephoto lens.

The flash 1320 may emit light that is used to reinforce light reflected from an object. According to an embodiment, the flash 1320 may include one or more light emitting diodes (LEDs) (e.g., a red-green-blue (RGB) LED, a white LED, an infrared (IR) LED, or an ultraviolet (UV) LED) or a xenon lamp. The image sensor 1330 may obtain an image corresponding to an object by converting light emitted or reflected from the object and transmitted via the lens assembly 1310 into an electrical signal. According to an embodiment, the image sensor 1330 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1330 may be implemented using, for example, a charged coupled device (CCD) sensor or a complementary metal oxide semiconductor (CMOS) sensor.

The image stabilizer 1340 may move the image sensor 1330 or at least one lens included in the lens assembly 1310 in a particular direction, or control an operational attribute (e.g., adjust the read-out timing) of the image sensor 1330 in response to the movement of the camera module 1280 or the electronic device 1201 including the camera module 1280. This allows compensating for at least part of a negative effect (e.g., image blurring) by the movement on an image being captured. According to an embodiment, the image stabilizer 1340 may sense such a movement by the camera module 1280 or the electronic device 1201 using a gyro sensor (not shown) or an acceleration sensor (not shown) disposed inside or outside the camera module 1280. According to an embodiment, the image stabilizer 1340 may be implemented, for example, as an optical image stabilizer. The memory 1350 may store, at least temporarily, at least part of an image obtained via the image sensor 1330 for a subsequent image processing task. For example, if image capturing is delayed due to shutter lag or multiple images are quickly captured, a raw image obtained (e.g., a Bayer-patterned image, a high-resolution image) may be stored in the memory 1350, and its corresponding copy image (e.g., a low-resolution image) may be previewed via the display module 1260 which comprises a display. Thereafter, if a specified condition is met (e.g., by a user's input or system command), at least part of the raw image stored in the memory 1350 may be obtained and processed, for example, by the image signal processor 1360. According to an embodiment, the memory 1350 may be configured as at least part of the memory 1230 or as a separate memory that is operated independently from the memory 1230. Each processor herein comprises processing circuitry.

The image signal processor 1360 may perform one or more image processing with respect to an image obtained via the image sensor 1330 or an image stored in the memory 1350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1360 may perform control (e.g., exposure time control or read-out timing control) with respect to at least one (e.g., the image sensor 1330) of the components included in the camera module 1280. An image processed by the image signal processor 1360 may be stored back in the memory 1350 for further processing, or may be provided to an external component (e.g., the memory 1230, the display module 1260, the electronic device 1202, the electronic device 1204, or the server 1208) outside the camera module 1280. According to an embodiment, the image signal processor 1360 may be configured as at least part of the processor 1220, or as a separate processor that is operated independently from the processor 1220. If the image signal processor 1360 is configured as a separate processor from the processor 1220, at least one image processed by the image signal processor 1360 may be displayed, by the processor 1220, via the display module 1260 as it is or after being further processed.

According to an embodiment, the electronic device 1201 may include a plurality of camera modules 1280 having different attributes or functions. In such a case, at least one of the plurality of camera modules 1280 may form, for example, a wide-angle camera and at least another of the plurality of camera modules 1280 may form a telephoto camera. Similarly, at least one of the plurality of camera modules 1280 may form, for example, a front camera and at least another of the plurality of camera modules 1280 may form a rear camera.

An electronic device according to an example embodiment may include
    at least one camera, an encoder connected to the at least one camera through a first interface having a first number of signal lines, and a decoder connected to the encoder through a second interface having a second number of signal lines, which is less than the first number. The encoder may provide data encoded based on data obtained from the at least one camera through the first interface and identification information indicating each of the first number of signal lines to the decoder through the second interface.

An electronic device according to an example embodiment may include at least one processor connected to the decoder through a third interface having a third number of signal lines, which is greater than the second number. The decoder may decode the encoded data and provide the same to the at least one processor through the third interface.

In an electronic device according to an example embodiment, the length of the second interface may be greater than the length of the third interface, and the distance between the encoder and the decoder may be greater than the distance between the decoder and the at least one processor.

An electronic device according to an example embodiment may include a first codec including the encoder, and a second codec including the decoder. The second codec may provide data encoded based on data obtained from the at least one processor through the third interface and identification information indicating each of the third number of signal lines to the first codec through the second interface.

In an electronic device according to an example embodiment, the first codec may decode the encoded data and provide the same to the at least one camera through the first interface.

In an electronic device according to an example embodiment, the electronic device may be augmented reality (AR) glasses and include a first glass member, a second glass member, a first member adjacent to the first glass member, a second member adjacent to the second glass member, a connection member connecting the first member and the second member, a third member extending from the first member, and a fourth member extending from the third member.

In an electronic device according to an example embodiment, the at least one camera may include a first gaze tracking camera and a second gaze tracking camera, wherein the first gaze tracking camera may be positioned on, directly or indirectly, one outer surface of the first member, wherein the second gaze tracking camera may be positioned on, directly or indirectly, one outer surface of the second member, wherein the encoder may be positioned on, directly or indirectly, one inner surface of the connection member, and wherein the decoder and the at least one processor may be positioned on, directly or indirectly, one inner surface of the third member.

In an electronic device according to an example embodiment, the second interface may be positioned on, directly or indirectly, one inner surface of the connection member, the first member, and the third member.

An electronic device according to an example embodiment may include a first head camera connected to the at least one processor through a fourth interface having the first number of signal lines, and the at least one camera may include a second head camera. The first head camera may be positioned on, directly or indirectly, one outer surface of the first member, the second head camera may be positioned on, directly or indirectly, one outer surface of the second member, the encoder may be positioned inside the second member, and the decoder and the at least one processor may be positioned inside the third member.

In an electronic device according to an example embodiment, the at least one processor may obtain data obtained from the first head camera through the fourth interface, and obtain data obtained from the second head camera through the first interface, the encoder, the second interface, the decoder, and the third interface.

In an electronic device according to an example embodiment, the second number may be 2.

An operation method of an electronic device according to an example embodiment may include obtaining data by at least one camera included in the electronic device, providing, by the at least one camera, the data to an encoder included in the electronic device through a first interface having a first number of signal lines, performing encoding, by the encoder, based on the data and identification information indicating each of the first number of signal lines, and providing, by the encoder, the encoded data to a decoder included in the electronic device through a second interface having a second number of signal lines, which is less than the first number.

An operation method of an electronic device according to an example embodiment may include decoding the encoded data and providing the same to at least one processor included in the electronic device through a third interface having a third number of signal lines, which is greater than the second number, by the decoder.

In an operation method of an electronic device according to an example embodiment, the electronic device may include a first codec including the encoder, and a second codec including the decoder, and the method may include providing, by the at least one processor, data to the second codec through the third interface, performing encoding, by the second codec, based on the data and identification information indicating each of the third number of signal lines, and providing, by the second codec, the encoded data to the first codec through the second interface.

An operation method of an electronic device according to an example embodiment may include decoding the encoded data and providing the same to the at least one camera through the first interface by the first codec.

Augmented reality glasses according to an example embodiment may include at least one camera, a first codec connected, directly or indirectly, to the at least one camera through a first interface having a first number of signal lines, a second codec connected, directly or indirectly, to the first codec through a second interface having a second number of signal lines, which is less than the first number, and at least one processor connected, directly or indirectly, to the second codec through a third interface having a third number of signal lines, which is greater than the second number. In the case where the at least one camera provides data to the at least one processor, the first codec may provide data encoded based on data obtained from the at least one camera through the first interface and identification information indicating each of the first number of signal lines to the second codec through the second interface, and the second codec may decode the encoded data and provide the same to the at least one processor, and in the case where the at least one processor provides data to the at least one camera, the second codec may provide data encoded based on data obtained from the at least one processor through the third interface and identification information indicating each of the third number of signal lines to the first codec through the second interface, and the first codec may decode the encoded data and provide the same to the at least one camera. "Based on" as used herein covers based at least on.

In augmented reality glasses according to an example embodiment, the second number may be 2, and the second interface may transmit data including an embedded clock signal in a differential signal method.

In augmented reality glasses according to an example embodiment, the at least one camera may include a first camera and a second camera. The first interface and the third interface may have 8 types of signal lines such as a first mobile industry processor interface (MIPI), a first inter-integrated circuit (I2C), a first VSYNC, a first RESET, a second MIPI, a second I2C, a second VSYNC, and a second RESET.

In augmented reality glasses according to an example embodiment, the at least one processor may provide data in the form of a command to the second codec, the third interface may have two types of signal lines such as an MIPI and an I2C.

In augmented reality glasses according to an example embodiment, the first interface may have 6 types of signal lines such as an MIPI, an improved inter-integrated circuit (I3C), a first VSYNC, a first RESET, a second VSYNC, and a second RESET.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
    at least one camera;
    an encoder connected to the at least one camera through at least a first interface comprising a first number of signal lines; and
    a decoder connected to the encoder through at least a second interface comprising a second number of signal lines, wherein the second number is less than the first number,
    wherein the encoder is configured to provide data encoded based on data obtained from the at least one camera through at least the first interface and identification information indicating each of the first number of signal lines to the decoder through at least the second interface.

2. The electronic device of claim 1, further comprising at least one processor connected to the decoder through at least a third interface comprising a third number of signal lines, wherein the third number is greater than the second number,
    wherein the decoder is configured to decode the encoded data and provide at least the decoded data to the at least one processor through at least the third interface.

3. The electronic device of claim 2, wherein a length of the second interface is greater than a length of the third interface, and
    a distance between the encoder and the decoder is greater than a distance between the decoder and the at least one processor.

4. The electronic device of claim 2, comprising:
    a first codec comprising the encoder; and
    a second codec comprising the decoder,
    wherein the second codec is configured to provide data encoded based on data obtained from the at least one processor through at least the third interface and identification information indicating each of the third number of signal lines to the first codec through at least the second interface.

5. The electronic device of claim 4, wherein the first codec is configured to decode the encoded data and provide the decoded data to the at least one camera through at least the first interface.

6. The electronic device of claim 2, wherein the electronic device comprises augmented reality (AR) glasses, and comprises:
    a first glass member;
    a second glass member;
    a first support adjacent to the first glass member;
    a second support adjacent to the second glass member;
    a connection member connecting the first support and the second support;
    a third support extending from the first support; and
    a fourth support extending from the third support.

7. The electronic device of claim 6, wherein the at least one camera comprises a first gaze tracking camera and a second gaze tracking camera,
    the first gaze tracking camera is positioned on an outer surface of the first support,
    the second gaze tracking camera is positioned on an outer surface of the second support,
    the encoder is positioned on an inner surface of the connection member, and
    the decoder and the at least one processor are positioned on an inner surface of the third support.

8. The electronic device of claim 7, wherein the second interface is positioned on an inner surface of the connection member, the first support, and the third support.

9. The electronic device of claim 6, comprising a first head camera connected to the at least one processor through at least a fourth interface comprising the first number of signal lines,
    wherein the at least one camera comprises a second head camera,
    the first head camera is positioned on an outer surface of the first support,
    the second head camera is positioned on an outer surface of the second support,
    the encoder is positioned at least partially inside the second support, and
    the decoder and the at least one processor are positioned at least partially inside the third support.

10. The electronic device of claim 9, wherein the at least one processor is configured to:
    obtain data obtained from the first head camera through at least the fourth interface; and
    obtain data obtained from the second head camera through at least the first interface, the encoder, the second interface, the decoder, and the third interface.

11. The electronic device of claim 1, wherein the second number is 2.

12. An operation method of an electronic device, the operation method comprising:
    obtaining data by at least one camera included in the electronic device;
    providing, by the at least one camera, the data to an encoder included in the electronic device through at least a first interface comprising a first number of signal lines;
    performing encoding, by the encoder, based on the data and identification information indicating each of the first number of signal lines; and
    providing, by at least the encoder, the encoded data to a decoder included in the electronic device through at least a second interface comprising a second number of signal lines, wherein the second number is less than the first number.

13. The operation method of an electronic device of claim 12, comprising, by the decoder, decoding the encoded data and providing the decoded data to at least one processor included in the electronic device through at least a third interface comprising a third number of signal lines, wherein the third number is greater than the second number.

14. The operation method of an electronic device of claim 13, wherein the electronic device comprises a first codec comprising the encoder and a second codec comprising the decoder, and the operation method comprises:
    providing, by the at least one processor, data to the second codec through at least the third interface;
    performing encoding, by the second codec, based on the data and identification information indicating each of the third number of signal lines; and
    providing, by the second codec, the encoded data to the first codec through at least the second interface.

15. The operation method of an electronic device of claim 14, comprising, by the first codec, decoding the encoded data and providing the decoded data to the at least one camera through at least the first interface.

* * * * *